United States Patent [19]

Maggio et al.

[11] Patent Number: 5,814,146
[45] Date of Patent: Sep. 29, 1998

[54] MDF CEMENT COMPOSITIONS WITH IMPROVED IMPACT STRENGTH

[75] Inventors: Rosa Di Maggio, Trento; Marcello Franchini, Tione Di Trento; Gianluca Guerrini, Cernusco Sul Naviglio; Claudio Migliaresi; Stefano Poli, both of Trento, all of Italy

[73] Assignee: Italcementi S.P.A., Bergamo, Italy

[21] Appl. No.: 765,427

[22] PCT Filed: Jul. 4, 1995

[86] PCT No.: PCT/EP95/02586

§ 371 Date: Dec. 31, 1996

§ 102(e) Date: Dec. 31, 1996

[87] PCT Pub. No.: WO96/01234

PCT Pub. Date: Jan. 18, 1996

[30] Foreign Application Priority Data

Jul. 6, 1994 [IT] Italy ................................. MI94A1407

[51] Int. Cl.⁶ ........................... C04B 24/00; C04B 21/02; C04B 24/12
[52] U.S. Cl. ........................... 106/802; 106/634; 106/696; 106/708; 106/724; 106/727; 106/778; 106/781; 106/790; 106/808; 106/822; 106/823; 264/175; 264/176.1; 264/211.11; 264/333; 524/4; 524/5; 524/6
[58] Field of Search ..................................... 106/696, 724, 106/802, 727, 778, 781, 708, 808, 822, 823, 634, 790; 264/175, 176.1, 211.11, 333, DIG. 81; 524/4, 5, 6

[56] References Cited

U.S. PATENT DOCUMENTS 4,070,199  1/1978  Downing et al. ....................... 106/696

FOREIGN PATENT DOCUMENTS

| 0030408 | 6/1981 | European Pat. Off. . |
| 0038126 | 10/1981 | European Pat. Off. . |
| 0055035 | 6/1982 | European Pat. Off. . |
| 0021681 | 1/1984 | European Pat. Off. . |
| 0114518 | 8/1984 | European Pat. Off. . |
| 0115137 | 8/1984 | European Pat. Off. . |
| 0158471 | 10/1985 | European Pat. Off. . |
| 0280971 | 9/1988 | European Pat. Off. . |
| 0332388 | 9/1989 | European Pat. Off. . |
| 0351730 | 1/1990 | European Pat. Off. . |
| 96/01234 | 1/1996 | WIPO . |

OTHER PUBLICATIONS

Toughening of MDF —OPC Composites, Mat. Res. Soc. Symp. Proc. vol. 211. 1991 Materials Research Society.

Abstract of Italian Patent Specification No. 1,068,427 (Mar. 1985).

English version of ENV 197–1: 1992 standard Italian UNI ENV 197, 1.

*Primary Examiner*—Anthony Green
*Attorney, Agent, or Firm*—McDermott, Will & Emery

[57] ABSTRACT

The invention concerns a MDF cement material showing better impact strength meant as an increase in the breaking total energy, by fibers addition.

24 Claims, No Drawings

MDF CEMENT COMPOSITIONS WITH IMPROVED IMPACT STRENGTH

FIELD OF THE INVENTION

The present invention concerns a cement material containing polymers, which shows an improved impact strength, meant as an increase in breaking total energy, thanks to fibers addition.

PRIOR ART

The so called MDF (macro defect free) cement, namely free from macroscopic defects, is a kind of cement well known in the art.

The American Patent U.S. Pat. No. 4,070,199 in fact describes an hydraulic material having a high flexural strength, prepared by kneading by means of a cylinder mixer a mixture of hydraulic cement, water and a polymer soluble or dispersable in water.

The product is then pressed and left to harden.

Subsequent Patents (EP 55035 and EP 21682) describe other polymeric materials which can be included in cement mixtures, such as hydroxypropylmethylcellulose or partially hydrolized polyvinyl acetate.

The use of fibers in MDF cement matrices is well known in the art. For instance, Italian Patent No. 1,068,427 reports the use of inorganic mineral fibers (asbestos fibers), organic or polymeric fibers (polypropylene or nylon). According to such a Patent, after addition of nylon fibers cut in 20 deniers pieces having a constant length equal to 10 mm, the hardened cement matrix shows a high proportional elastic limit, which remains substantially equal even when increasing the quantity of fibers up to 6% by weight.

However it is necessary to emphasize that in the whole known art relating to the MDF products, fibers addition to the cement matrix in order to replace the fracture behaviour of the composite with a typically pseudo-ductile stress-strain trend has never been considered. The addition of fibers was instead described in order to increase the mechanical resistance nevertheless preserving a breaking behaviour of fragile kind.

For instance, the patent EP 114,518 teaches a way to improve the fracture energy of these materials by adding randomly distributed fibers in the shape of a fibrous "mat" or in a cloth-shaped oriented way.

However, even if efficacious in order to produce laminated materials, the achievement of cement materials of this kind prevents from producing materials having more complex geometrical shapes, and in any case, does not modify the behavior of the composite material, but rather it only increases its impact strength.

The article "Toughening of MDF Composites" by C. K. Park (Mat. Res. Soc. Symp. Proc. vol. 211, 1991) reports examples of the use of short carbon, glass or cellulose fibers for preparing particular MDF matrices (comprising fly ashes and microsilica) to estimate the impact strength of the resulting materials in the elastic field ($K_{IC}$).

The problem that the present invention wants to solve is not that of obtaining a composite material with increased mechanical resistance with respect to the base matrix but that of achieving a composite cement material able to support high loads at high strains even after the fracture propagation inside the composite itself has started. This means to define the achievement of the impact strength of the composites of the invention as the increase in the breaking total energy (the integral of the stress-strain curve) combined with a modification of the breaking behavior of the material from fragile to pseudo-ductile. Therefore we mean to consider the whole stress-strain curve up to the achievement of the maximum load, rather than limiting ourselves just to the part of the curve included in the elastic field.

In the present description and claims, "pseudo-ductile" material means a material which, when stressed by a flexure load, shows an improved post fracture impact strength. To even better explain the problem which the invention solves, one has to keep in mind that a traditional MDF cement matrix gives way once stressed by a load having low strain values, whereas the products of the present invention are such that the fibers therein contained preserve the capability to transfer the stress through the fracture by means of bridge bonds formation and therefore undergo pull out processes with consequent increase of absorbed energy.

By "pull out" we mean the mechanism by which a fiber subjected to a direct or indirect load, pulls out of the matrix in which it is inserted. Pull out allows energy dissipation in the form of detachment at the fiber-matrix interface (debonding) and of friction due to fiber pulling out to be obtained. It is known in the art that addition of fibers to traditional cements involves a change of the stress-strain curve providing some composite materials which show improved strengths and/or high strains.

SUMMARY OF THE INVENTION

Unlike such composite materials (fiber-reinforced cements) obtained by means of classical cement preparation technologies, the MDF cements containing fibers object of the present invention, have the peculiarity of being prepared by high shear stress mixing technologies (calendering for instance) which modify in a substantial way their microstructure.

The introduction of fibers in MDF materials can not in any case be inferred from the knowledge of fiber-reinforced cement materials without considering the problems caused by the particular preparation technology associated with these materials.

Moreover, the characteristic of these materials which must be macrodefect free prevents from easily forecasting the physical mechanical characteristics of the end product, since the fibers may introduce macroscopic defects in the material itself. In the present invention the above defined pseudo-ductile behaviour is obtained by making use of the pull out mechanism of fibers having particular geometrical characteristics. Therefore object of the present invention is a cement composition of MDF kind, comprising an hydraulic cement, water, an organic polymer soluble (or dispersable) in water, 3D randomly dispersed alkali resistant discontinuous fibers, and optionally other additives, such as for instance glycerol, said composition being characterized in that it is homogenized by a high shear stress mixing technique and in that after the homogenization the discontinuous fibers preserve a L/Ed aspect ratio ranging from 50 to 700.

Another object of the present invention concerns a process for producing a cement composition including 3D randomly dispersed alkali resistant discontinuous fibers having a L/Ed aspect ratio ranging from 50 to 700, which comprises homogenizing a mixture able to produce the above defined composition by means of high shear stress mixing techniques. A further object of the present invention concerns a hardened MDF cement composition, characterized in that it has pseudo-ductile characteristics. Another object of the present invention is a process for preparing a MDF cement composition showing pseudo-ductile characteristics, which comprises first homogenizing by high shear stress mixing a mixture of the ingredients of the composition as above defined, then subjecting the resulting mixture to hardening, after optional insertion of at least one polymeric net between two layers of fiber-reinforced materials. Detailed description of the invention The fibers, which are one of the characterizing aspects of the invention, can vary either by chemical nature or by geometry, thus influencing the final characteristics of the product. The fibers usable according to the present invention can be natural or artificial, inorganic or organic.

However it is necessary that the fibers are "alkali resistant". By this expression we mean that the fibers exposed to an alkaline environment (pH 12.8) at 80° C. for 3000 hours in a cement slurry preserve at least the 80% of their mechanical characteristics with respect to the not exposed fibers.

Fibers preferred for the present invention are organic artificial fibers such as polyethylene (PE), polypropylene (PP) (optionally fibrillated polypropylene) and polyvinylalcohol (PVA) fibers.

By "discontinuous fibers" we mean fibers obtained by cutting continuous fibers, defining as continuous fibers the fibers having an infinite aspect ratio (L/Ed) at their formation; while by the expression "3D randomly dispersed" we mean fibers uniformly dispersed, all together, inside the matrix. The estimation of the aspect ratio (L/Ed) is an essential element for the present invention.

By this expression in the claims and in the description we mean a dimensionless number obtained dividing the fiber length (L) by its equivalent diameter (Ed).

In particular by the term equivalent diameter we mean the fiber diameter when this has a circular section, or the quantity $$\sqrt{4A/\pi}$$

where A is the area of the fiber cross section when this is not circular.

In order that the fibers are effectively suitable for use in the preparation of the product of the invention it is indispensable that the aspect ratio varies within certain limits as a result of the homogenization of the composite. The fibers after homogenization must preserve an aspect ratio L/Ed ranging from 50 to 700, preferably from 50 to 400.

Particularly appreciated are the fibers which maintain an aspect ratio between 50 and 200.

When said ratio is lower than 50 the fibers do not allow the material impact strength to be increased, whereas when said ratio has values greater than 700, the dispersability is so low that the material does not acquire particular toughening properties. Moreover, when the aspect ratio is so high, it is extremely difficult to obtain a sufficient dispersability. In order to have a qualitative indication about the influence of the aspect ratio and therefore of the dispersion on the manufacture characteristics, it is sufficient to consider that lowering the aspect ratio, the dispersion improves but the reinforcing effect decreases. On the other hand, if the aspect ratio is increased, the reinforcement properties increase but the homogenization is reduced to such an extent as to lower the reinforcement efficacy too.

After homogenization, the fibers to be used in the invention therefore must maintain essentially unaltered their aspect ratio or at least must not show an aspect ratio lower than 50. For instance, after high shear stress homogenization for 5 minutes carbon fibers show an aspect ratio lower than 50 and can not therefore be used for the purposes of the present invention.

The quantity of fibers to be used is not a binding characteristic of the invention, and in any case depends on the fibers and matrix characteristics; generally, the fibers are added in a quantity ranging from 0.5 to 20% by volume, preferably from 3 to 12%. The best results in toughening terms have been obtained with 9% by volume percentages.

It is also possible to prepare composite systems having cement matrix which comprise two or more different kinds of discontinuous fibers. For instance it was observed that polyvinyl alcohol fibers and fibrillated polypropylene fibers are able to increase in a significant way the fracture energy of the MDF composite.

A further aspect of the present invention concerns the insertion of one or more kinds of discontinuous fibers in the presence of polymeric nets, such as polyvinyl alcohol or polypropylene nets. Such an insertion does not modify the toughening characteristics and the fracture energy of the MDF composite.

This fact is surprising enough as the insertion of nets necessarily also involves the introduction of defects in the cement matrix. Any kind of polymeric net known in the art can be used but particularly remarkable results have been obtained by polyvinyl alcohol PVA KURARAY® VH1313 or VK0707 nets having respectively 8×8 cm and 15×15 cm meshes and by polypropylene PP SOCHITAL® nets having 4×5 cm meshes.

The nets are inserted between two layers of fiber-reinforced MDF cement paste.

For instance, the nets were inserted after a first layer of MDF paste having a thickness of 3 mm, and later covered by a second layer having a thickness equal to 5 mm; in this case, after pressure forming for 10 minutes at a pressure equal to 100 bar and at 80° C., a single fiber-reinforced by nets MDF specimen having a thickness about equal to 5 mm was obtained. Any kind of hydraulic cement can be used in the cement materials of the invention.

By the term "hydraulic cement" we mean any material setting and hardening by water addition, and that consequently sets and hardens in presence of water.

The hydraulic cement may be a silicate based cement (siliceous) for instance Portland cement, an aluminate based cement (aluminous), for instance a calcium aluminate based cement, or a mixed cement such as a pozzolan.

It is also possible to use mixtures of two or more different hydraulic cements. According to a preferred embodiment of the invention, aluminate based cements are used; particularly SECAR® 50 and 77 aluminous cement and Ciment Fondu® (Lafarge) cement. According to a further preferred embodiment of the invention Portland ITALCEMENTI® cement is used.

Any aggregate, optionally fly ashes and additives for preparing the mixtures known in the art can be used in the cement material of the invention.

Practically every common cement reported in the Italian UNI ENV 197,1 standard (ENV 197-1: 1992) and commercially available can be used in the cement compositions of the invention, such as:

Portland cement, Portland-composite cement, blastfurnace cement, pozzolanic cement and composite cement. The cement composition of the invention must necessarily comprise an organic polymer soluble or dispersable in water. The polymer is used in order to give the cement mixture the necessary mouldability characteristic of this kind of cement, and to improve its mechanical characteristics.

As far as the present invention is concerned, there is no limit to the kind of polymers soluble or dispersable in water which can be used. Examples of polymers soluble or dispersable in water polymers which can be suitably used are:

alkyl and hydroxyalkyl cellulose ethers (methylcellulose, hydroxyethylcellulose, methylhydroxy ethyl cellulose, ethyl-hydroxyethylcellulose, propylcellulose, hydroxypropylmethylcellulose, hydroxybutylmethylcellulose)

acrylamide polymers or copolymers, (polyacrylamide, polymethacrylamide, acrylamide/methacrylamide copolymer); vinylacetate hydrolizable polymers or copolymers, particularly polyvinylacetate; vinyl alcohol polymers or copolymers;

alkylene oxide polymers (polyalkylene glycols having molecular weight above 10.000)

polyalkoxy-derivatives of alcohols, phenols. Every polymer soluble or dispersable in H20 reported in the European Patent No. 280,971 can be used in the present invention. According to EP 280,971, organic polymers such as water-soluble polymer or water-dispersibe polymers in the form of a polymer emulsion or a polymer latex can be used. EP 280,971 reports water-soluble polymers such as water-soluble proteins, water soluble starchs, water soluble cellulose derivatives (e.g. hydroxypropylmethyl cellulose), partially hydrolized polyvinyl acetate, polyvinyl alcohol, polyacrylic soda, polyethylene oxide, polyacrylamide, cross-linked acrylic acid polymer, water-soluble urea resin, water-soluble melamine resin, water-soluble epoxy resin, water-soluble polyester, water-soluble phenolformaldehyde resin, water-soluble amine neutralization alkyd resin, polyvinyl methylether, polyvinylpyrrolidone, polystyrene sulfonic acid, and quaternary polyvinyl pyridine; and water-dispersible polymers such as those in the form of rubber latex, acrylic emulsion, vinyl acetate emulsion, vinyl chloride emulsion, ethylene-vinyl acetate emulsion, polypropylene emulsion, epoxy resin emulsion, polyurethane emulsion, polyamide emulsion, or bituminous emulsion.

Particularly preferred polymer is polyvinyl alcohol, in particular that having fine granulometry, for instance the GOHSENOL® KH 17S polyvinylalcohol.

Examples of cement matrices which can be used for the preparation of the MDF pseudo tenacious manufactures of the invention are those described in the following European Patents: 332388, 21682, 158471, 114518, 115137, 55035, 38126, 30408 and 21681.

The polymer content in the cement mixture can range from 0.1 to 20% by weight with respect to the hydraulic cement amount, preferably from 0.3 and 10% by weight. The water amount, even though it can change as a function of the different kind of polymer, is preferably not greater than 30% by weight with respect to the hydraulic cement amount. Greater water amounts can quickly depress the mechanical characteristics of the final material. The mixtures useful for the preparation of the MDF cement of the invention have been prepared considering the additional water requirement necessary to process a mixture containing reasonable fiber volumes. In fact, after some preliminary tests to verify the mixtures workability, it was observed that fibers incorporation implies a certain loss in workability provided that the water amount is kept constant as per standard formulation.

Then we chose a formulation different from that normally used, either in the case of MDF Portland cement or of the aluminous one, due to the fact that while it is true that an increase in water amount of the mixture yields MDF cements having lower mechanical properties (flexural strength ~100 MPa when an aluminous matrix is used) it is also true that such an increase allows mixtures of MDF cement added with fibers to be processed in the presence of high volumes of the latter (up to 12% by volume). Therefore a compromise was reached between the amount of added water and the volume of introduced fibers, and such factors were kept constant to be able to compare among them the different mixtures reinforced by different fibers.

Such preparations containing greater water amounts were done for principally exemplificative purposes in order to magnify the differences among the different kinds of fiber. From an industrial point of view, it is preferred to decrease workability and to increase the final mechanical resistances (230 MPa) by selecting water and polymer amounts as above described.

It is essential, for the process of the invention, that the compositions based on not hardened cement be homogeneous. By the term "homogeneous" we mean that the ingredients of the composition, essentially formed by hydraulic cement, polymer soluble or dispersable in water, water, fibers, and optionally other additives, have been subjected to dispersion processes to such an extent as to make the final material to have a uniform density. Processes particularly suitable to produce such a condition in a not hardened composition comprise extrusion and calendering.

Preferably, the ingredients are first mixed and then subjected to a first high shear stress mixing phase and to deaeration processes, by means of which a rough heterogeneity is removed and a pulp is produced.

This material then undergoes a second compaction and dispersion phase in order to obtain a not hardened cement composition, showing the required homogenization degree. Preferably, this second phase comprises extrusion or calendering processes.

The ingredients of the present invention, however, can be subjected to whatever suitable condition producing a homogeneous composition, provided that homogenization occurs by high shear stress processing techniques.

The not hardened, homogeneous, cement composition of the present invention can be modelled in the shape of semimanufactured products and, subsequently hardened and dried to obtain the finished articles. The shaping operation can be carried out during or immediately after the homogenization, for instance by extrusion or by calendering. We hereinbelow report some illustrative examples of the present invention which must not be considered limitative of the invention itself.

EXAMPLE 1

A mixture of the following components was prepared:

1000 g of SECAR® 71 aluminous cement 140 g of water and glycerol mixture (0.12%)

70 g of polyvinylalcohol (PVA) GOHSENOL®

The components were mixed in a Hobart crown wheel mixer for total 5 min.

The mixture obtained after processing in the crown wheel mixer was passed for some minutes (2–3) through the rolls of a high shear stress mixer (cylinder size: diameter 150 mm×300 mm, velocity of the front roll 12 rpm, velocity of the rear roll 10 rpm), until the polymer, the cement and the water become an homogeneous paste.

Then 78 g of PVA RF 350 12 mm discontinuous fibers (9% vol on the matrix) were added homogenizing up to a total dispersion (5 min). The PVA fibers were homogeneously dispersed in the cement matrix to such an the extent that presence of lumps or little tufts of fibers capable in case of creating some weakness points in the finished material were not noticed.

The fibers did not undergo to size variations after the insertion phase, thus maintaining a constant aspect ratio (L/Ed=60). At the end of the operation a paste having a thickness about equal to 7–8 mm was prepared so to obtain in the subsequent pressing phase a desired thickness equal to 5 mm.

Working under such conditions, one is able to obtain a complete homogenization of the fibers inside the cement mixture after performing dispersion of the fibers all together. The so obtained paste was subjected to hot pressing (80° C.) for 10 min at a pressure equal to 100 bar (paste sizes about 200×300 mm).

Some 5 mm pieces were pressed to make the final thickness of the composite constant for any slab produced with the different fibers.

The slabs coming out of the press were kept for 24 hours in a stove at constant temperature (80° C.) in order to complete the hardening phase.

Once the slabs completed the curing cycle (press+stove), some specimens having fixed sizes were cut by means of diamond blade circular saw, for the purpose of being subsequently subjected to mechanical tests.

EXAMPLE 2

A mixture of the following components was prepared:

1000 g of SECAR® 71 aluminous cement 140 g of water and glycerol mixture (0.12%)

70 g of polyvinylalcohol (PVA) GOHESENOL®

The components were mixed in a Hobart crown wheel mixer for total 5 min.

The mixture obtained after processing in the crown wheel mixer was passed for some minutes (2–3) through the rolls of a high shear stress mixer (cylinder size: diameter 150 mm×300 mm), obtaining an homogeneous paste.

Then 55 g of SOCHITAL® 10 mm (9% vol on the matrix) discontinuous polypropylene fibers in form of fibrils were added, homogenizing up to total dispersion (8 min).

The fibers did not undergo to size changes after the insertion phase, thus maintaining a constant aspect ration (L/Ed=160). The rolls spin velocity in this case was equal to 20 rpm for the front roll and to 16 rpm for the rear one. After a 3 minutes processing, the rolls spin velocities were set to 12 and 10 rpm respectively.

The pulp so obtained was processed substantially as described in Example 1.

EXAMPLE 3 (comparative)

A mixture of the following components was prepared:

1000 g of SECAR® 71 aluminous cement 140 g of water and glycerol mixture (0.12%)

70 g of polyvinylalcohol (PVA) GHOSENOL®

The components were mixed in a Hobart crown wheel mixer for total 5 min.

The mixture obtained after processing in the crown wheel mixer was passed for some minutes (2–3) through the rolls of a high shearing stress mixer as in the previous examples. 96 g of RK 10 6 mm carbon discontinuous fibers (9% by vol on the matrix) were added. Among all the used kinds of fibers, carbon fibers were the ones which mixed best.

However, after the calendering phase, the fibers broke from the initial 6 mm in length in many fragments having length equal to 100–200 $\mu$m (L/Ed=25). The remaining operations were carried out analogously to Example 1.

EXAMPLE 4 (comparative)

A mixture was prepared substantially as described in Example 1, except that glass fibers CEM FIL 2 (6 mm) were added. After the calendering phase, fibers aspect ratio (L/Ed) was equal to 14.

EXAMPLE 5 (standard)

The process described in Example 1 was repeated without adding any kind of fibers, so to compare the various samples of the previous examples.

EXAMPLE 6

The specimens of the previous Examples were submitted to two kinds of mechanical tests to estimate impact strength, ductility and strength characteristics of the hardened composites.

The specimens were cut using a diamond blade. The sizes are those reported according to the ASTM 399-83 standard for the determination of the metallic materials impact strength (there is no specific standard for the MDF cement): length 60 mm, width 10 mm and thickness 5 mm. Two kinds of mechanical tests were performed: flexural test and impact tests.

The flexure text was a so-called single-edge notched bending (SEN (B)) three points type test wherein specimen sizes were fixed according to the before cited ASTM 399-83 standard. The test served to evaluate the principal mechanical characteristics of the composite: modulus of elasticity (E), impact strength (R), tenacity (r), fracture energy (ET). The apparatus used to carry out such measures was an Instron 4302, having a 10 KN load cell, with test velocity equal to 1 mm/min and a span equal to 50 mm.

The impact test was carried out to estimate the main resistance properties of such materials to a destructive collision: estimation of fracture total energy and of material resilience. The apparatus used to perform such kinds of tests was a Charpy pendulum with a 4.3 kg striking hammer, having a pendulum inclination angle initially equal to 45 and with a pendulum velocity equal to 1.21 m/s. The main characteristics measured by means of such a device were breaking total energy and material resilience.

Table 1 reports the results of such tests.

TABLE 1

| Ex | Specimen | Breaking res. o (mPa) | Elast. modulus E (GPa) | Impact strength mJ/m3 | Fracture energy kJ/m2 | Charpy Resilience kJ/m2 |
|---|---|---|---|---|---|---|
| 5 | Standard | 126 | 28 | 33 | 1.65 | 5.6 |
| 1 | PVA | 94 | 25.5 | 115 | 5.70 | 11.4 |
| 2 | PP | 61 | 22 | 72 | 8.56 | 7.37 |
| 3 | Carbon | 114 | 24 | 32 | 1.60 | 4.7 |
| 4 | Glass | 95 | 24 | 22 | 1.11 | 3.7 |

As it can be noticed from the Table, even if the materials resistances decrease by addition of fibers with respect to the standard, both the tenacity and the fracture energy of the specimens with polyvinylalcohol (PVA) and polypropylene fibers are observed to remarkably increase, whereas in the case of comparison samples the decrease in resistance is not compensated by an increase in fracture energy.

The same indications are obtained also from the impact test (Charpy pendulum)

EXAMPLE 7

A mixture as described in Example 1 was prepared, except that 36 g of polyvinylalcohol PVA RF 350 12 mm (54% by vol on the matrix) discontinuous fibers and 24 g of fibrillated polypropylene PP 10 mm (45% by vol on the matrix) discontinuous fibers were added.

After the insertion phase, the fibers maintained a constant L/Ed ratio. The paste was then treated as described in Example 1. The mechanical tests were carried out according to what described in Example 6. The results are reported in the Table 2.

TABLE 2

| Specimen | Elast. modulus E (GPa) | Impact strength mJ/m3 | Fracture energy kJ/m2 | Charpy Resilience kJ/m2 |
|---|---|---|---|---|
| STD (ex. 5) | 28 | 33 | 1.65 | 5.6 |
| PVA + PP | 22.6 | 194 | 9.70 | 6.9 |

EXAMPLE 8

A mixture as described in Example 1 was prepared, adding 73 g of polyvinylalcohol PVA RF 350 12 mm (9% by vol on the mixture) discontinuous fibers and 1 PVA polyvinylalcohol KURARAY® VH1313 (9×9 meshes) net having a weight equal to 78 g/m2 (2% by vol on the mixture).

The net was inserted between two layers of fiber-reinforced material, before the pressing and curing phase. The subsequent preparation conditions were analogous to those of Example 1, while mechanical kind tests were carried out according to what described in Example 6.

The results are reported in Table 3.

TABLE 3

| Specimen | Elast. modulus E (GPa) | Impact strength mJ/m3 | Fracture energy kJ/m2 | Resilience Charpy kJ/m2 |
|---|---|---|---|---|
| STD (ex. 5) | 28 | 33 | 1.65 | 5.6 |
| PVA (ex. 1) | 25.5 | 115 | 5.70 | 11.4 |
| PVA + net | 26.0 | 86 | 4.31 | 11.6 |

We claim:

1. In a macro defect free cement composition comprising a hydraulic cement, water, an organic polymer soluble or dispersable in water, and at least one 3D randomly dispersed alkali resistant discontinuous fiber, wherein 3D randomly dispersed refers to fibers uniformly dispersed inside the cement matrix, an alkali resistant fiber is a fiber which when exposed to an alkaline environment (pH 12.8) at 80° C. for 3000 hours in a cement slurry maintain at least 80% of mechanical characteristics with respect to not exposed fibers, wherein said macro defect free cement composition is homogenized by means of high shear stress mixing, the improvement of which comprises using fibers which after homogenization by high shear stress mixing maintain an aspect ratio L/Ed ranging from 50 and 700, wherein L stands for fiber length and Ed stands for equivalent diameter, said equivalent diameter being selected from the group consisting of fiber diameter, when the fiber has a circular section, and the quantity $$\sqrt{4A/\pi},$$

wherein A is the area of the fiber cross section, when the fiber is not circular.

2. The composition as claimed in claim 1, further comprising at least one polymeric net inserted between two layers of fiber-reinforced material.

3. The composition as claimed in claim 1, wherein said fiber maintains an aspect ratio ranging from 50 to 400 after homogenization.

4. The composition as claimed in claim 1, wherein said fiber maintains an aspect ratio ranging from 50 to 200 after homogenization.

5. The composition as claimed in claim 1, wherein said fiber is an organic artificial fiber selected from the group consisting of polyethylene, polypropylene and polyvinylalcohol fibers.

6. The composition as claimed in claim 1, wherein said fiber is in an amount ranging from 0.5 to 20% by volume.

7. The composition as claimed in claim 1, wherein said hydraulic cement is selected from Portland cement, Portland-composite cement, blastfurnace cement, pozzolanic cement or composite cement.

8. The composition as claimed in claim 1, wherein said organic polymer soluble or dispersable in water is selected from the group consisting of alkyl and hydroxyalkyl cellulose ethers, acrylamide polymers, acrylamide copolymers, vinylacetate hydrolizable polymers, vinylacetate hydrolizable copolymers, vinylalcohol polymers, vinylalcohol copolymers, alkylene oxide polymers and polyalkoxy polymers of alcohols or phenols.

9. The composition as claimed in claim 1, wherein said polymer is in an amount ranging from 0.1 to 20% by weight with respect to the hydraulic cement amount.

10. The composition as claimed in claim 2, wherein said polymeric net is selected from the group consisting of polyvinylalcohol and polypropylene nets.

11. The composition as claimed in claim 1, which once hardened after water addition to the hydraulic cement has pseudo ductile characteristics, wherein pseudo ductile means showing an improved post fracture impact strength when stressed by a flexure load.

12. The composition as claimed in claim 1, wherein said hydraulic cement is selected from the group consisting of silicate based cement, aluminate based cement and pozzolans.

13. The composition as claimed in claim 1, wherein said fibers are in an amount ranging from 3 to 12% by volume.

14. The cement composition as claimed in claim 1, which further comprises an additive.

15. The composition as claimed in claim 14, wherein said additive is glycerol.

16. The composition as claimed in claim 5, wherein said polypropylene fiber is fibrillated polypropylene fiber.

17. The composition as claimed in claim 8, wherein said organic polymer is polyvinylalcohol.

18. The composition as claimed in claim 9, wherein said organic polymer is in an amount ranging from 0.3 to 10% by weight with respect to the hydraulic cement amount.

19. A process for the preparation of the macro defect free cement composition of claim 1, which comprises mixing the ingredients of the composition, then subjecting to a high shearing stress mixing, then to deareation, and then to homogenization by means of compaction and dispersion.

20. The process as claimed in claim 19, wherein the second homogenization is conducted by extrusion or calendering.

21. The process as claimed in claim 19, which further comprises shaping the composition in the form of a semi-manufactured product, and subsequently hardening and drying.

22. A process for preparing a macro defect free (MDF) cement composition having pseudo-ductile characteristics, wherein pseudo-ductile means showing an improved post fracture impact strength when stressed by a flexure load, said composition comprising a hydraulic cement, water, an organic polymer soluble or dispersable in water and at least one 3D randomly dispersed alkali resistant discontinuous fiber, wherein 3D randomly dispersed refers to fibers uniformly dispersed inside the cement matrix, an alkali resistant fiber is a fiber which when exposed to an alkaline environment (pH 12.8) at 80° C. for 3000 hours in a cement slurry maintain at least 80% of mechanical characteristics with respect to not exposed fibers, wherein said fiber is a fiber able to maintain an aspect ratio L/Ed ranging from 50 to 700 after homogenization by high shear mixing wherein L stands for fiber length and Ed stands for equivalent diameter, said equivalent diameter being selected from the group consisting of fiber diameter, when the fiber has a circular section, and the quantity $$\sqrt{4A/\pi}\ ,$$

wherein A is the area of the fiber cross section, when the fiber is not circular, said process comprising first homogenizing by high shear stress mixing the composition, and later subjecting the resulting mixture to a hardening phase, after optional insertion of at least one polymeric net between two layers of fiber-reinforced material.

23. In a macro defect free cement composition comprising an hydraulic cement, water, an organic polymer soluble or dispersable in water, and at least one 3D randomly dispersed discontinuous fiber selected from the group consisting of polyethylene, polypropylene and polyvinylalcohol fibers, wherein 3D randomly dispersed refers to fibers uniformly dispersed inside the cement matrix, wherein said macro defect free cement composition is homogenized by means of high shear stress mixing, the improvement of which comprises using fibers which after homogenization by high shearing stress mixing maintain an aspect ratio L/Ed ranging from 50 and 700, wherein L stands for fiber length and Ed stands for equivalent diameter, said equivalent diameter being selected from the group consisting of fiber diameter, when the fiber has a circular section, and the quantity $$\sqrt{4A/\pi}\ ,$$

wherein A is the area of the fiber cross section, when the fiber is not circular.

24. A process for preparing a macro defect free composition which comprises a hydraulic cement, water, an organic polymer soluble or dispersible in water, and at least one 3D randomly dispersed alkali resistant fiber which maintains an aspect ratio L/Ed ranging from 50 to 700 after homogenization by means of high shear stress mixing, wherein 3D randomly dispersed refers to fibers uniformly dispersed inside the cement matrix, an alkali resistant fiber is a fiber which when exposed to an alkaline environment (pH 12.8) at 80° C. for 3000 hours in a cement slurry maintain at least 80% of mechanical characteristics with respect to not exposed fibers, wherein L stands for fiber length and Ed stands for equivalent diameter, said equivalent diameter being selected from the group consisting of fiber diameter, when the fiber has a circular section, and the quantity $$\sqrt{4A/\pi}\ ,$$

wherein A is the area of the fiber cross section, when the fiber is not circular, said process comprising homogenizing by high shear mixing the mixture of ingredients of the composition.

* * * * *